(12) United States Patent
Takashima et al.

(10) Patent No.: US 9,106,802 B2
(45) Date of Patent: Aug. 11, 2015

(54) DUAL-TYPE OF PLAYBACK FOR MULTIMEDIA CONTENT

(75) Inventors: Yoshikazu Takashima, Los Angeles, CA (US); Saravana Prabhu Anbananthan, Los Angeles, CA (US)

(73) Assignees: SONY CORPORATION, Tokyo (JP); SONY CORPORATION OF AMERICA, New York, NY (US); SONY PICTURES ENTERTAINMENT INC., Culver City, CA (US)

( * ) Notice: Subject to any disclaimer, the term of this patent is extended or adjusted under 35 U.S.C. 154(b) by 527 days.

(21) Appl. No.: 12/426,006

(22) Filed: Apr. 17, 2009

(65) Prior Publication Data

US 2009/0265479 A1 Oct. 22, 2009

Related U.S. Application Data

(60) Provisional application No. 61/045,917, filed on Apr. 17, 2008.

(51) Int. Cl.
```
G06F 15/16      (2006.01)
H04N 5/917      (2006.01)
H04N 7/173      (2011.01)
H04N 21/2343    (2011.01)
H04N 21/61      (2011.01)
```
(Continued)

(52) U.S. Cl.
CPC ....... *H04N 7/17318* (2013.01); *H04N 21/2343* (2013.01); *H04N 21/6125* (2013.01); *H04N 21/8455* (2013.01); *H04N 13/0048* (2013.01); *H04N 13/0066* (2013.01); *H04N 19/00569* (2013.01); *H04N 19/00781* (2013.01); *H04N 21/85406* (2013.01)

(58) Field of Classification Search
CPC .......... H04N 13/0048; H04N 13/0066; H04N 19/00781; H04N 21/85406; H04N 19/00569
USPC .......................................... 709/231; 386/329
See application file for complete search history.

(56) References Cited

U.S. PATENT DOCUMENTS 6,792,047 B1 * 9/2004 Bixby et al. ............. 375/240.26
2002/0033842 A1 * 3/2002 Zetts ............................ 345/719

(Continued)

FOREIGN PATENT DOCUMENTS

JP       2002033802 A       1/2002
JP       2004013527 A       1/2004

(Continued)

OTHER PUBLICATIONS

Adler et al., "Optimal Peer Selection for P2P Downloading and Streaming", 2005, IEEE, p. 1-12.*

(Continued)

*Primary Examiner* — Taylor Elfervig
(74) *Attorney, Agent, or Firm* — Procopio, Cory, Hargreaves & Savitch, LLP

(57) ABSTRACT

Using multimedia data for both continuous playback and streaming playback purposes, including: encoding an elementary stream of multimedia content into a fixed length of a group of pictures; multiplexing the encoded multimedia content into a transport stream; locating data offsets of each GOP header inside the transport stream; and uploading the data offsets along with the transport stream to a server. Continuous and streaming playback of multimedia content.

11 Claims, 4 Drawing Sheets

(51) Int. Cl.
*H04N 21/845* (2011.01)
*H04N 19/50* (2014.01)
*H04N 13/00* (2006.01)
*H04N 19/61* (2014.01)
*H04N 21/854* (2011.01)

(56) References Cited

U.S. PATENT DOCUMENTS

| | | | |
|---|---|---|---|
| 2002/0048450 A1* | 4/2002 | Zetts | 386/95 |
| 2002/0062313 A1 | 5/2002 | Lee et al. | |
| 2003/0021346 A1* | 1/2003 | Bixby et al. | 375/240.25 |
| 2003/0115282 A1* | 6/2003 | Rose | 709/214 |
| 2004/0218902 A1* | 11/2004 | Yanagita | 386/52 |
| 2005/0207569 A1* | 9/2005 | Zhang et al. | 380/28 |
| 2005/0259639 A1 | 11/2005 | Kryeziu | |
| 2006/0077472 A1 | 4/2006 | Yahata et al. | |
| 2006/0218251 A1 | 9/2006 | Tanabe | |
| 2007/0047661 A1* | 3/2007 | Yoshinari | 375/240.25 |
| 2007/0162611 A1* | 7/2007 | Yu et al. | 709/232 |
| 2008/0119218 A1* | 5/2008 | Dumitru et al. | 455/550.1 |
| 2009/0006643 A1* | 1/2009 | Lee | 709/231 |

FOREIGN PATENT DOCUMENTS

| | | |
|---|---|---|
| JP | 2004-509580 A | 3/2004 |
| JP | 2007-515096 A | 6/2007 |
| KR | 10-2001-0068851 A | 7/2001 |
| KR | 10-2002-0063830 A | 8/2002 |
| KR | 10-2004-0074623 A | 8/2004 |
| KR | 10-2006-0063329 A | 6/2006 |
| WO | 01/52554 A1 | 7/2001 |
| WO | 02/25949 A2 | 3/2002 |
| WO | 2004/084448 A2 | 9/2004 |
| WO | 2005/046140 A1 | 5/2005 |
| WO | 2007/074520 A1 | 7/2007 |

OTHER PUBLICATIONS

Zhengye Liu, Yanming Shen, Shivendra S. Panwar, Keith W. Ross, and Yao Wang. 2007. Using layered video to provide incentives in P2P live streaming. In Proceedings of the 2007 workshop on Peer-to-peer streaming and IP-TV (P2P-TV '07). ACM, New York, NY, USA, 311-316.*

Ortiz et al., "Broadcasting of H.264/SVC video over BitTorrent-like networks", p. 41-46, Computers Architecture and Electronics Department, 1st Workshop on Multimedia Data Coding and Transmission, Sep. 2010.*

Huahui Wu, Mark Claypool, and Robert Kinicki. 2006. Guidelines for selecting practical MPEG group of pictures. In Proceedings of the 24th IASTED international conference on Internet and multimedia systems and applications (IMSA'06), A. C. Boucouvalas (Ed.). ACTA Press, Anaheim, CA, USA, 61-66.*

International Search Report and Written Opinion issued in corresponding PCT/US2009/041009 on Jan. 6, 2010.

Farber et al., "Adaptive progressive download based on the MPEG-4 file format," Journal of Zhejiang University—Science A, 2006, vol. 7, Supplement 1, pp. 106-111, available at URL http://www.zju.edu.cn/jzus/2006/A06S1/A06S118.

Supplementary European Search Report issued for European Application No. 09763081.8, dated Sep. 10, 2012, 9 pages.

* cited by examiner

DUAL-TYPE OF PLAYBACK FOR MULTIMEDIA CONTENT

CROSS-REFERENCE TO RELATED APPLICATIONS

This application claims the benefit of priority under 35 U.S.C. §119(e) of U.S. Provisional Patent Application No. 61/045,917, filed Apr. 17, 2008, entitled "Mechanism for Streaming Audiovisual Content with Embedded Timing Information and Other Semantic Constraints." The disclosure of the above-referenced provisional application is incorporated herein by reference.

BACKGROUND

1. Field of the Invention

The present invention relates to multimedia content, and more specifically, to using such multimedia content for both continuous playback and streaming playback purposes.

2. Background

Streaming media over the Internet has enabled Web users to experience multimedia with sound and moving pictures. Streaming media over the Internet provides the low cost, convenience, and technical simplicity of using one global communications standard. Users once denied access to such powerful means of communication are now using the Web to connect with people all over the world.

Multimedia streaming operates by compressing a multimedia file and then breaking it into small packets. The packets are then sent, one after another, over the Internet. When the packets reach the requesting user, they are decompressed and reassembled into a form that can be played by the user's system. To maintain the illusion of seamless play, a number of the packets are downloaded to and buffered on the user's machine before playback. As the buffered packets play, more packets are downloaded and queued up for playback.

However, audio-video systems typically have timing information and other semantic constraints that prevent playback of partially downloaded content unless the multimedia content is specifically configured for streaming playback. Hence, separate files are made and stored for continuous playback and streaming playback of content.

SUMMARY

In one implementation, a method of using multimedia data for both continuous playback and streaming playback purposes is disclosed. The method including: encoding an elementary stream of multimedia content into a fixed length of a group of pictures; multiplexing the encoded multimedia content into a transport stream; locating data offsets of each GOP header inside the transport stream; and uploading the data offsets along with the transport stream to a server.

In another implementation, a method of servicing a request for either a continuous playback or streaming playback is disclosed. The method including: (1) when a request for the continuous playback is received, (a) transmitting an entire transport stream to a client; and (2) when a request for the streaming playback is received, (a) determining a chunk size of the streaming playback, (b) determining a fixed multiple of an original group of pictures (GOP) length which provides a closest match to the chunk size, wherein the original GOP length is a fixed length of a GOP used to encode an elementary stream of multimedia content, and (c) transmitting the determined fixed multiple of an original GOP length of the elementary stream to a client.

In yet another implementation, a system for using multimedia data for both continuous playback and streaming playback purposes is disclosed. The system including: an encoder configured to encode an elementary stream of multimedia content into a fixed length of a group of pictures (GOP); a multiplexer configured to: (1) multiplex the encoded multimedia content into a transport stream; (2) locate data offsets of each GOP header inside the transport stream; and (3) upload the data offsets along with the transport stream.

In a further implementation, a computer-readable storage medium storing a computer program for using multimedia data for both continuous playback and streaming playback purposes is disclosed. The computer program including executable instructions that cause a computer to: encode an elementary stream of multimedia content into a fixed length of a group of pictures; multiplex the encoded multimedia content into a transport stream; locate data offsets of each GOP header inside the transport stream; and upload the data offsets along with the transport stream to a server.

Other features and advantages of the present invention will become more readily apparent to those of ordinary skill in the art after reviewing the following detailed description and accompanying drawings.

DETAILED DESCRIPTION

Figure 1:
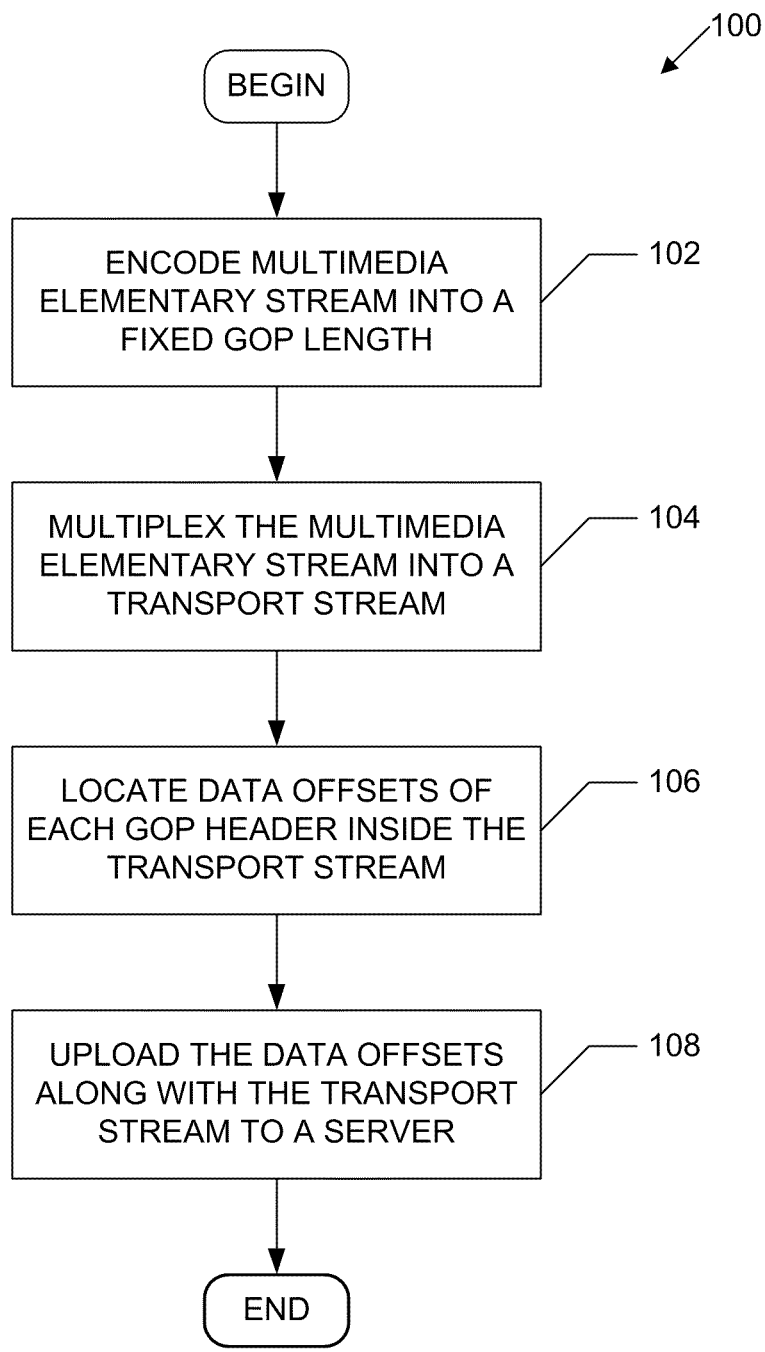
FIG. 1 is a flowchart illustrating a process for using multimedia data for both continuous playback and streaming playback purposes in accordance with one implementation of the present invention.

Certain implementations as disclosed herein provide a technique for using multimedia data for both continuous playback and streaming playback purposes. After reading this description it will become apparent how to implement the invention in various alternative implementations and alternative applications. However, although various implementations of the present invention will be described herein, it is understood that these implementations are presented by way of example only, and not limitation. As such, this detailed description of various alternative implementations should not be construed to limit the scope or breadth of the present invention.

In one example, a content provider creates encoded data for an item of content (e.g., a movie in DVD or Blu-ray Disc format) and stores the encoded data on a server computer system. This encoded data can be used for continuous playback (e.g., presenting the content of the encoded data when all of the encoded data is present in storage). This is how a movie is typically presented from a digital file(s) stored on an optical disc or hard disk drive. By itself, however, the encoded data can only be presented when the entire set of encoded data is present in storage. Accordingly, to provide continuous playback or presentation for a client computer system, the server system provides all the encoded data to the client system. Once the client system has all the encoded data, the client system can use it for continuous playback.

The content provider also creates streaming playback metadata for streaming playback or presentation for a client computer system (e.g., presenting the content of the encoded data when only part of the encoded data is present in storage). This type of playback (i.e., streaming playback) is used when the content is being presented progressively as the encoded data is being downloaded from a network server. This metadata (for streaming playback) indicates the timing and semantic information needed to provide streaming playback from the encoded data. The metadata is specific to the client system and can be generated after the encoded data has been generated. To provide streaming playback or presentation for a client computer system, the content provider's server system provides the streaming playback metadata to the client system and then streams the encoded data to the client system. In one implementation, part of the streaming playback metadata can also be streamed to the client. The client system uses the received streaming playback metadata to process the encoded data as it is received to be able to present the content.

When content data is encoded to prepare a continuous playback version of the content data, metadata is generated and preserved that will allow the same encoded data to be used for both continuous playback and streaming playback. The encoding includes transcoding, compression, and/or other processing of the content data. Other processing includes: creating and preserving streaming playback metadata; and using streaming playback metadata and encoded data to provide streaming playback, where the encoded data can also be used for continuous playback.

As discussed above, audio-video systems typically have timing information and other semantic constraints that prevent playback of partially downloaded content. Thus, separate files have to be made for continuous playback and streaming playback of content. In a new audio-video system, content created for continuous playback can be re-used to provide streaming playback. The new system creates a single encode of multimedia content and generates metadata that captures all semantic information. In one case, the semantic information includes information that needs to be adjusted in order to stream the multimedia content. In another case, the metadata is used dynamically to locate offsets in the original encode and deliver a streaming-compliant version. The benefits of the capability to locate offsets dynamically include the ability to stream from intermediate points and the ability to adjust chunk size based on a network speed. This capability can also be used for random access of multimedia content.

In one particular implementation, the elementary stream of multimedia content is encoded into a fixed length of a group of pictures (a GOP length). This makes every GOP header a boundary that can be used for streaming. Therefore, once the multimedia content is encoded, it is multiplexed into a transport stream, and from the multiplexed stream, the data offsets of each GOP header inside the transport stream are located. The data offsets along with the transport stream are then uploaded to a server. When the server receives a continuous playback request, the entire transport stream is sent. Otherwise, when a streaming playback request is received, a chunk size of the streaming playback is determined. This can be done by the client or server. Subsequently, the multimedia data is sent in multiples of the original GOP length with the closest match to this chunk size. Thus, the same transport stream is used for both streaming and continuous playback.

FIG. 1 is a flowchart illustrating a process 100 for using multimedia data for both continuous playback and streaming playback purposes in accordance with one implementation of the present invention. In the illustrated implementation of FIG. 1, the elementary stream of multimedia content is encoded, at box 102, into a fixed length of a group of pictures (a GOP length). This makes every GOP header a boundary that can be used for streaming. Once the multimedia content is encoded, at box 102, the encoded multimedia content is multiplexed into a transport stream, at box 104. From the multiplexed stream, the data offsets of each GOP header inside the transport stream are located, at box 106. The data offsets along with the transport stream are then uploaded to a server, at box 108.

Figure 2:
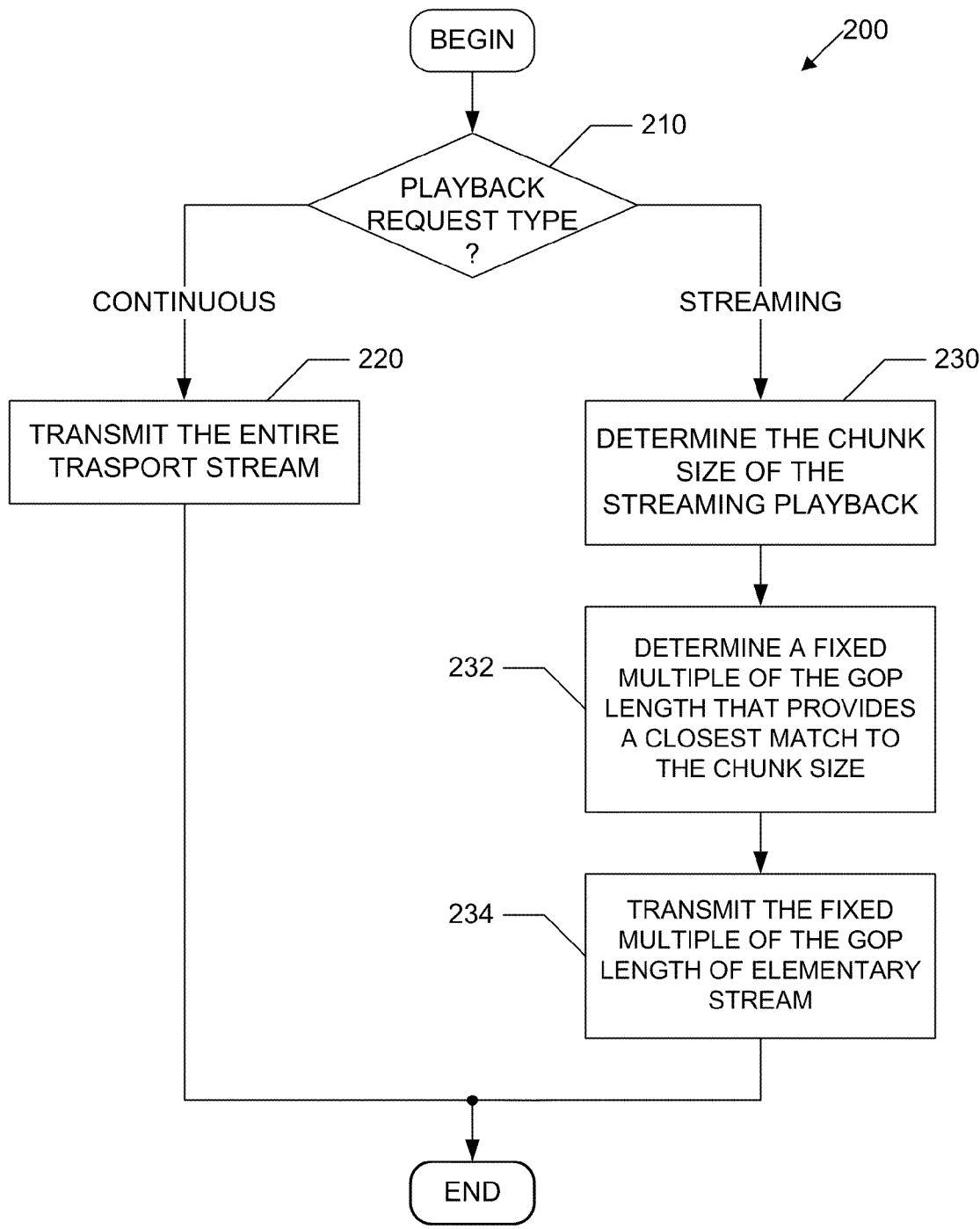
FIG. 2 is a flowchart illustrating a process for servicing a request for either a continuous or streaming playback in accordance with one implementation of the present invention.

FIG. 2 is a flowchart illustrating a process 200 for servicing a request for either a continuous or streaming playback in accordance with one implementation of the present invention. For example, when a server receives a continuous playback request, at box 210, the entire transport stream is sent, at box 220. Otherwise, when a streaming playback request is received, at box 210, a chunk size of the streaming playback is determined, at box 230. This can be done by the client or server. Subsequently, a fixed multiple of the original GOP length which provides a closest match to the chunk size is determined, at box 232. At box 234, the determined fixed multiple of the GOP length of the elementary stream is transmitted. Thus, the same transport stream is used for both streaming and continuous playback.

Figure 3:
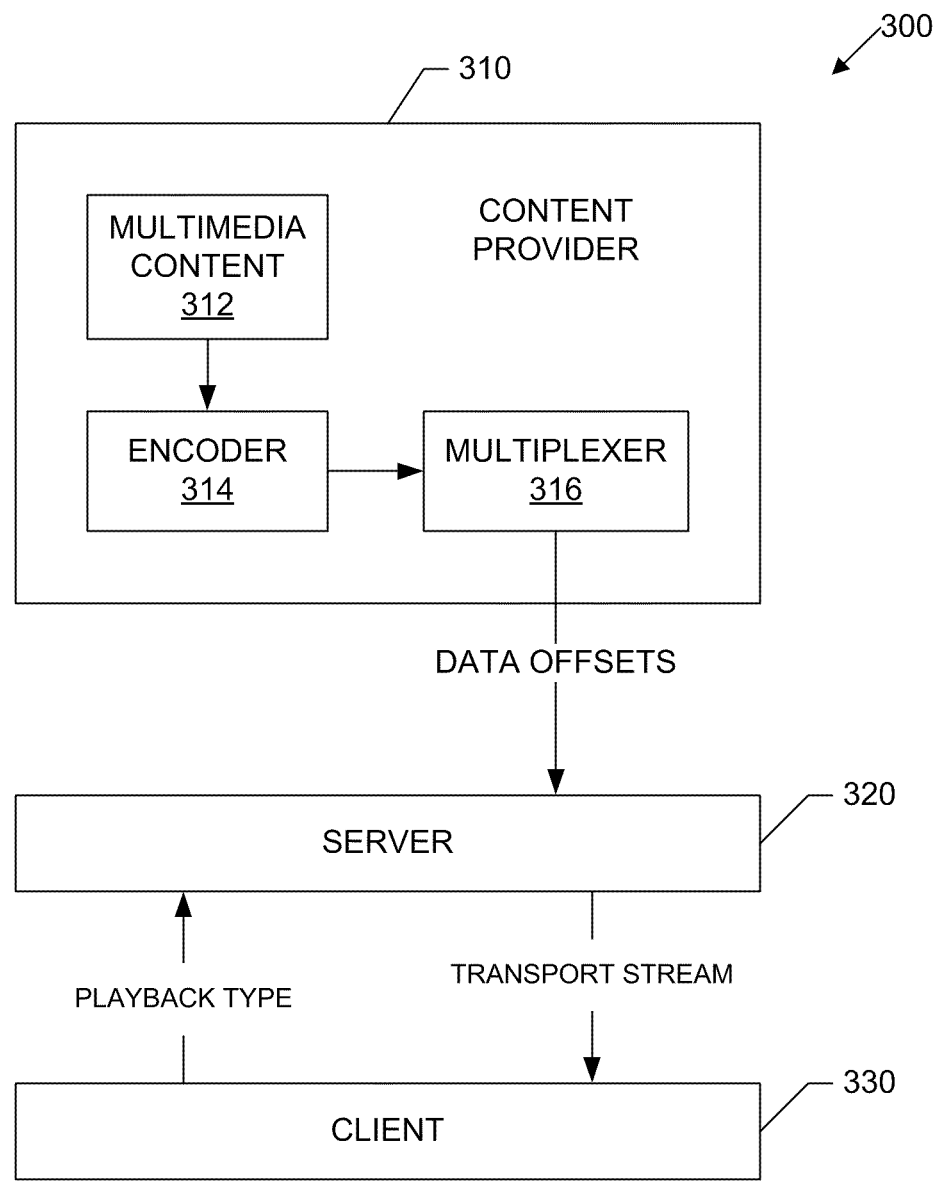
FIG. 3 is a block diagram of a dual playback capable system for using multimedia data for both continuous playback and streaming playback purposes in accordance with one implementation of the present invention.

FIG. 3 is a block diagram of a dual playback capable system 300 for using multimedia data for both continuous playback and streaming playback purposes in accordance with one implementation of the present invention. In the illustrated implementation of FIG. 3, the system 300 includes a content provider 310, a server 320, and a client 330. The content provider 310 further includes multimedia content 312, an encoder 314, and a multiplexer 316. In some implementations, the server 320 is configured as a server operated by the content provider 310, and is configured within the content provider 310.

Initially, the encoder 314 encodes an elementary stream of multimedia content 312 into a fixed length of a group of pictures (a GOP length). This makes every GOP header a boundary that can be used for streaming. Once the multimedia content is encoded, the multiplexer 316 multiplexes the encoded multimedia content into a transport stream. From the multiplexed stream, the data offsets of each GOP header inside the transport stream are located. The content provider 310 then uploads the data offsets along with the transport stream to the server 320.

Further, the server 320 receives a playback request type (e.g., a streaming or continuous playback) from the client 330. When the server 320 receives a continuous playback request, the server 320 sends the entire transport stream to the client 330. Otherwise, when the server 320 receives a streaming playback request, the server 320 (or the client 330) determines a chunk size of the streaming playback. Subsequently, the server 320 (or the client 330) determines a fixed multiple of the original GOP length which provides a closest match to the chunk size, and transmits to the client 330 the determined fixed multiple of the GOP length of the elementary stream. Thus, the same transport stream is used for both streaming and continuous playback.

Figure 4A:
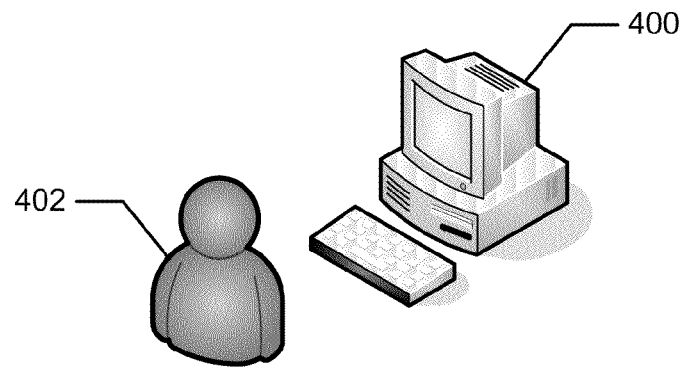
FIG. 4A illustrates a representation of a computer system and a user.

FIG. 4A illustrates a representation of a computer system 400 and a user 402. The user 402 uses the computer system 400 to provide multimedia data for both continuous playback and streaming playback purposes. The computer system 400 stores and executes a dual playback capable system 490.

Figure 4B:
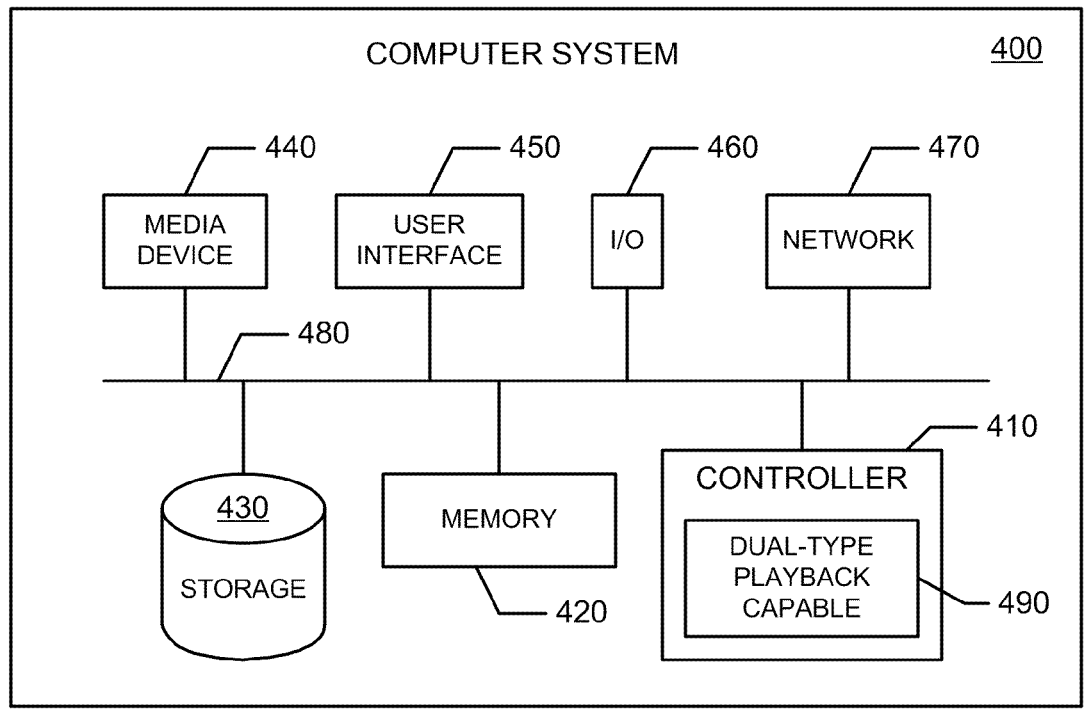
FIG. 4B is a functional block diagram illustrating the computer system hosting the dual playback capable system.

FIG. 4B is a functional block diagram illustrating the computer system 400 hosting the dual playback capable system 490. The controller 410 is a programmable processor and controls the operation of the computer system 400 and its components. The controller 410 loads instructions (e.g., in the form of a computer program) from the memory 420 or an embedded controller memory (not shown) and executes these instructions to control the system 400. In its execution, the controller 410 provides the dual playback capable system 490 as a software system. Alternatively, this service can be implemented as separate hardware components in the controller 410 or the computer system 400.

Memory 420 stores data temporarily for use by the other components of the computer system 400. In one implementation, memory 420 is implemented as RAM. In one implementation, memory 420 also includes long-term or permanent memory, such as flash memory and/or ROM.

Storage 430 stores data temporarily or long term for use by other components of the computer system 400, such as for storing data used by the dual playback capable system 490. In one implementation, storage 430 is a hard disk drive.

The media device 440 receives removable media and reads and/or writes data to the inserted media. In one implementation, for example, the media device 440 is an optical disc drive.

The user interface 450 includes components for accepting user input from the user of the computer system 400 and presenting information to the user. In one implementation, the user interface 450 includes a keyboard, a mouse, audio speakers, and a display. The controller 410 uses input from the user to adjust the operation of the computer system 400.

The I/O interface 460 includes one or more I/O ports to connect to corresponding I/O devices, such as external storage or supplemental devices (e.g., a printer or a PDA). In one implementation, the ports of the I/O interface 460 include ports such as: USB ports, PCMCIA ports, serial ports, and/or parallel ports. In another implementation, the I/O interface 460 includes a wireless interface for communication with external devices wirelessly.

The network interface 470 includes a wired and/or wireless network connection, such as an RJ-45 or "Wi-Fi" interface (including, but not limited to 802.11) supporting an Ethernet connection.

The computer system 400 includes additional hardware and software typical of computer systems (e.g., power, cooling, operating system), though these components are not specifically shown in FIG. 4B for simplicity. In other implementations, different configurations of the computer system can be used (e.g., different bus or storage configurations or a multi-processor configuration).

Various implementations are or can be implemented primarily in hardware using, for example, components such as application specific integrated circuits ("ASICs"), or field programmable gate arrays ("FPGAs"). Implementations of a hardware state machine capable of performing the functions described herein will also be apparent to those skilled in the relevant art. Various implementations may also be implemented using a combination of both hardware and software.

Furthermore, those of skill in the art will appreciate that the various illustrative logical blocks, modules, connectors, data paths, circuits, and method steps described in connection with the above described figures and the implementations disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, connectors, data paths, circuits, and method steps described in connection with the implementations disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the implementations disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. A storage medium can be coupled to the processor such that the processor can read information from, and write information to, the storage medium. In the alternative, the storage medium can be integral to the processor. The processor and the storage medium can also reside in an ASIC.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. Thus, it is to be understood that the description and drawings presented herein represent a presently preferred implementation of the invention and are therefore representative of the subject matter which is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. A method of using multimedia data for both continuous playback and streaming playback purposes, the method comprising:
   encoding an elementary stream of multimedia content into a fixed length of a group of pictures (GOP);
   multiplexing the encoded multimedia content into a transport stream;
   locating metadata including data offsets of each GOP header inside the transport stream,
   wherein the metadata indicates timing and semantic information needed to provide the streaming playback;
   locating the data offsets in the encoding of the elementary stream by dynamically using the metadata to enable streaming of the multimedia content from intermediate points of the multimedia content,
wherein a chunk size of the streaming playback is determined and adjusted based on a speed of the transport stream to allow random access of the multimedia content;
uploading the metadata along with the transport stream to a server;
receiving a request for a streaming playback from a client at the server;
transmitting the entire transport stream to the client when the server receives the request for streaming playback;
determining a chunk size of the streaming playback;
determining a fixed multiple of an original GOP length which provides a closest match to the chunk size, wherein the original GOP length is a fixed length of a GOP used to encode the elementary stream of multimedia content; and
transmitting the determined fixed multiple of the original GOP length of the elementary stream to the client using the data offsets of each GOP header inside the transport stream.

2. The method of claim 1, wherein the semantic information is information that needs to be adjusted in order to stream the multimedia content to a client.

3. The method of claim 2, further comprising
streaming part of the streaming playback metadata to the client.

4. A method of servicing a request for either a continuous playback or streaming playback, the method comprising:
(1) when a request for the continuous playback is received,
    (a) transmitting an entire transport stream to a client; and
(2) when a request for the streaming playback is received,
    (a) determining a chunk size of the streaming playback,
    (b) determining a fixed multiple of an original group of pictures (GOP) length which provides a closest match to the chunk size, wherein the original GOP length is a fixed length of a GOP used to encode an elementary stream of multimedia content, and
    (c) transmitting the determined fixed multiple of an original GOP length of the elementary stream to a client using data offsets of each GOP header inside a transport stream,
        wherein the transport stream is constructed by:
        encoding an elementary stream of multimedia content into the fixed length of a GOP;
        multiplexing the encoded multimedia content into the transport stream;
        locating metadata including the data offsets of each GOP header inside the transport stream,
        wherein the data offsets indicates timing and semantic information needed to provide the streaming playback,
        wherein the metadata is dynamically adjusted to locate the data offsets,
        wherein the chunk size of the streaming playback is adjusted based on a speed of the transport stream to allow random access of the multimedia content.

5. The method of claim 4, wherein the request is received at a server.

6. The method of claim 5, wherein determining a fixed multiple of an original GOP length includes
generating streaming playback metadata.

7. The method of claim 6, further comprising
providing streaming playback metadata; and
streaming the encoded multimedia content to the client.

8. A system for using multimedia data for both continuous playback and streaming playback purposes, the system comprising:
an encoder configured to encode an elementary stream of multimedia content into a fixed length of a group of pictures (GOP);
a multiplexer configured to:
(1) multiplex the encoded multimedia content into a transport stream;
(2) locate metadata including data offsets of each GOP header inside the transport stream, wherein the metadata indicates timing and semantic information needed to provide the streaming playback;
(3) locate the data offsets in the encoding of the elementary stream by dynamically using the metadata to enable streaming of the multimedia content from intermediate points of the multimedia content,
    wherein a chunk size of the streaming playback is determined and adjusted based on a speed of the transport stream to allow random access of the multimedia content;
(4) upload the metadata along with the transport stream;
a server configured to:
(1) receive a playback request type from a client;
(2) send an entire transport stream to the client, when the server receives a streaming playback request; and
(3) (a) determine a chunk size of the streaming playback,
    (b) determine a fixed multiple of an original group of pictures (GOP) length which provides a closest match to the chunk size,
        wherein the original GOP length is a fixed length of a GOP used to encode the elementary stream of multimedia content, and
    (c) transmit the determined fixed multiple of an original GOP length of the elementary stream to the client using the data offsets of each GOP header inside the transport stream.

9. A non-transitory computer-readable storage medium storing a computer program for using multimedia data for both continuous playback and streaming playback purposes, the computer program comprising executable instructions that cause a computer to:
encode an elementary stream of multimedia content into a fixed length of a group of pictures (GOP);
multiplex the encoded multimedia content into a transport stream;
locate streaming playback metadata including data offsets of each GOP header inside the transport stream,
wherein the streaming playback metadata indicates timing and semantic information needed to provide the streaming playback to a client;
locate the data offsets in the encoding of the elementary stream by dynamically using the metadata to enable streaming of the multimedia content from intermediate points of the multimedia content,
wherein a chunk size of the streaming playback is determined and adjusted based on a speed of the transport stream to allow random access of the multimedia content;
upload the metadata along with the transport stream to a server;
receive a request for a streaming playback from the client at the server;
transmit the entire transport stream to the client when the server receives the request for the streaming playback;
determine a chunk size of the streaming playback;

determine a fixed multiple of an original GOP length which provides a closest match to the chunk size, wherein the original GOP length is a fixed length of a GOP used to encode the elementary stream of multimedia content; and transmit the determined fixed multiple of the original GOP length of the elementary stream using the data offsets of each GOP header inside the transport stream.

10. The non-transitory computer-readable storage medium of claim 9, wherein executable instructions that cause a computer to locate data offsets includes executable instructions that cause a computer to generate the streaming playback metadata.

11. The non-transitory computer-readable storage medium of claim 10, further comprising executable instructions that cause a computer to stream part of the streaming playback metadata to the client.

\* \* \* \* \*